US006129632A

United States Patent [19]

Luciano

[11] Patent Number: 6,129,632

[45] **Date of Patent: *Oct. 10, 2000**

[54] METHOD AND DEVICE FOR PLAYING A GAME IN WHICH A PLAYER IS CHARGED FOR PERFORMING GAME PLAYING ACTIONS

[76] Inventor: Robert A. Luciano, 4665 Lakewood Ct., Revo, Nev. 89509

[ * ] Notice: This patent issued on a continued prosecution application filed under 37 CFR 1.53(d), and is subject to the twenty year patent term provisions of 35 U.S.C. 154(a)(2).

[21] Appl. No.: 09/267,126

[22] Filed: Mar. 10, 1999

Related U.S. Application Data

[62] Division of application No. 08/866,931, May 31, 1997, abandoned.

[51] Int. Cl.[7] .............................. A63F 1/00; A63F 13/00

[52] U.S. Cl. ................................ 463/12; 463/13; 463/20; 463/25; 273/143 R

[58] Field of Search ................................. 463/12, 13, 20, 463/25; 273/143 R, 138.2, 138 A

[56] References Cited

U.S. PATENT DOCUMENTS

| | | | |
|---|---|---|---|
| 5,042,818 | 8/1991 | Weingardt | 463/13 |
| 5,100,137 | 3/1992 | Fulton | 463/13 |
| 5,632,485 | 5/1997 | Woodland et al. | 273/292 |
| 5,653,635 | 8/1997 | Breeding | 463/11 |
| 5,711,715 | 1/1998 | Ringo et al. | 473/9 |
| 5,882,258 | 3/1999 | Kelly et al. | 463/11 |

FOREIGN PATENT DOCUMENTS

| | | | |
|---|---|---|---|
| 2230373 | 10/1990 | United Kingdom | 273/143 R |

*Primary Examiner*—Benjamin H. Layno
*Attorney, Agent, or Firm*—Ian F. Burns

[57] ABSTRACT

A method of playing a wagering game which is based upon a long-duration, multi-step game is disclosed. The method utilizes an underlying game which allows the player to perform predefined chargeable actions while the player is playing the underlying game. The player is charged for each chargeable action the player performs. The player is awarded a prize if a predefined prize event or condition occurs during the game. The method of the present invention may be applied to solitaire, poker, blackjack, slot machines, and many other kinds of games.

50 Claims, 5 Drawing Sheets

FIG. 2E

| HAND | STANDARD HAND PAYS | SAME COLOR HAND PAYS | SAME SUIT HAND PAYS |
|---|---|---|---|
| 1 ST BJ | 3 | 6 | 9 |
| 2 ND BJ | 4 | 8 | 12 |
| 3 RD BJ | 5 | 10 | 15 |
| 4 TH BJ | 6 | 12 | 18 |
| 1 ST-3 RD 21 | 2 | 4 | 6 |
| 4 TH-6 TH 21 | 3 | 6 | 9 |
| 7 TH- 21 | 4 | 8 | 12 |
| 6 CARDS UNDER 21 | 4 | 8 | 12 |
| 20 | 1 | 3 | 5 |
| 4 SUCCESSIVE BJ S IN ONE COLUMN | 50 | 150 | 500 |
| 3 SUCCESSIVE BJ S IN ONE COLUMN | 20 | 60 | 125 |
| 5 SUCCESSIVE 21 S IN ONE COLUMN | 15 | 45 | 100 |

USE ALL 52 CARDS ........ 25

FIG. 4A
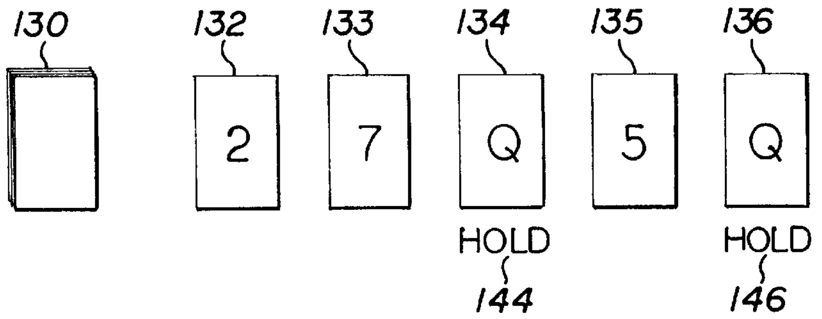
FIG. 4B
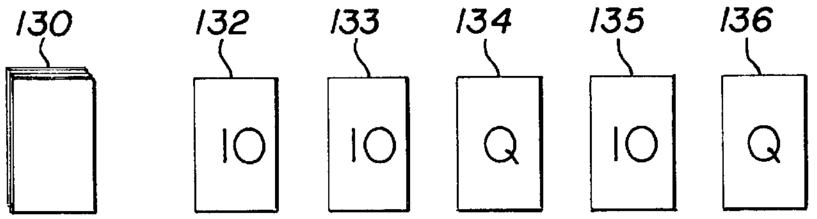
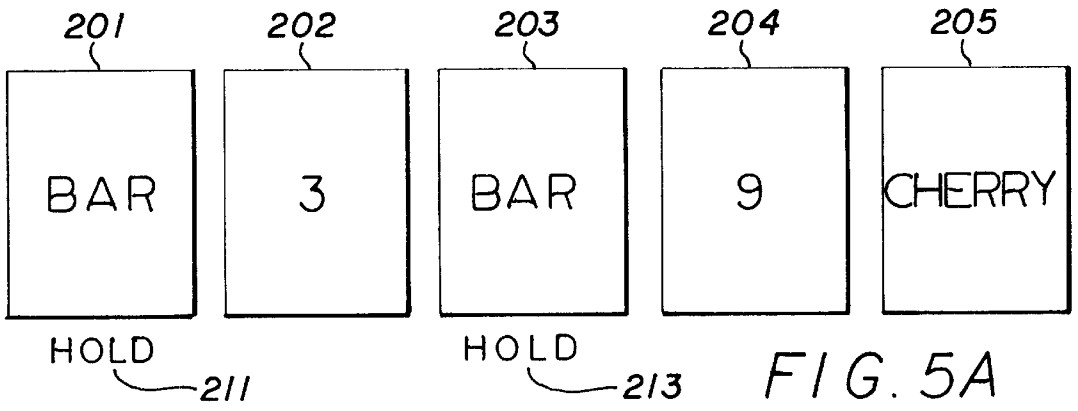
FIG. 5A
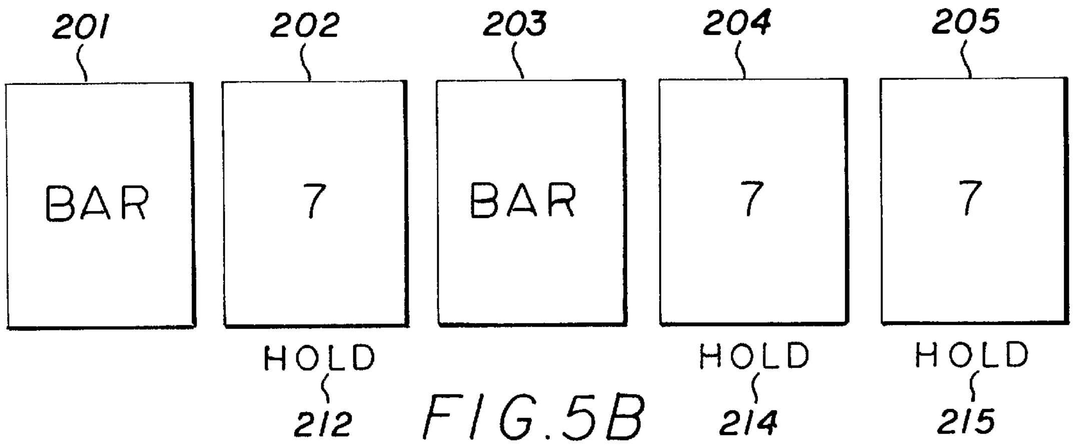
FIG. 5B

METHOD AND DEVICE FOR PLAYING A GAME IN WHICH A PLAYER IS CHARGED FOR PERFORMING GAME PLAYING ACTIONS

CROSS REFERENCE TO RELATED APPLICATIONS

This application is a divisional application of U.S. patent application Ser. No. 08/866,931 filed on May 31, 1997 now abandoned.

BACKGROUND OF THE INVENTION

1. Field of Invention

The present invention relates to a method for playing a wagering game. More particularly, the method is intended for use with an underlying game which requires a player to take multiple actions or game-playing steps to complete a single game cycle. In the method of the present invention, the player is charged a predefined amount for predefined chargeable actions the player performs to play the underlying game and the player may be awarded prizes when predefined events or conditions occur.

2. Description of Related Art

Long-duration, multi-step games are well known in the art. These games require a player to take a number of actions or game-playing steps in order to complete a game cycle. For example, the game of solitaire requires a player to take multiple actions in order to play and ultimately win the game. The player must shuffle through a partial deck of cards, move cards from the deck to columns, move cards between the columns, turn over cards in the columns, move cards from the columns to sequential suited stacks, and move cards from the deck to the sequential suited stacks. In general, the longer the player plays, the more game-playing steps the player will perform and the closer the player will come to winning the game.

Many people enjoy playing long-duration, multi-step games because these games have a long game cycle and they tend to involve a large degree of skill. However, in the past, multi-step games have not lent themselves to wagering. Wagering games generally have a short game cycle so that more wagers can be made in a given period of time. Casinos and other wagering game operators generally do not profit from games which last a relatively long period of time because only one wager is made during the course of the game. What has long been needed is a method by which long-duration, multi-step games may be adapted to wagering.

SUMMARY OF INVENTION

1. Objects of the Invention

It is an object of the present invention to provide a method of playing long-duration, multi-step wagering games.

It is another object of the present invention to provide a multi-step wagering game wherein the player is charged a predefined amount for each predefined chargeable action or game-playing step the player performs.

It is a further object of the present invention to provide a multi-step wagering game which is adapted to be used with electronic devices.

It is another object of the present invention to provide a multi-step wagering game which allows a player to use skill to prolong the game.

It is another object of the present invention to provide a multi-step wagering game which allows a player to win a large jackpot.

It is a further object of the present invention to provide a wagering game which is capable of producing low probability events by combining two or more high probability events within the same game or within successive games.

It is a further object of the present invention to provide a multi-step wagering game which may have a long or indeterminate length of game cycle.

It is still another object of the present invention to provide a multi-step wagering game which is enjoyable to play and attracts players who like to play multi-step games.

These and other objects of the present invention may be realized by reference to the other portions of the specification, claims, and abstract.

2. Brief Description of the Invention

In accordance with the above objectives, the present invention provides a method by which an underlying long-duration, multi-step game may be wagered upon. The method begins with a player making credits available to play the game. The credits may be deposited in a credit bank for access during the game. During the course of the game, credits may be added to or deducted from the credit bank.

Once the credits are made available, the player begins the game according to the rules of the particular underlying game. The game requires an indefinite number of game playing actions to play the game. During the course of the game, the player will perform certain actions which are predefined "chargeable" actions. A credit or credits are deducted from the player's credit bank whenever the player performs one of these actions. The credits charged the player are not additional wagers or antes; they are not required to initiate the game and they do not effect the size of any prize or jackpot which the player may receive. Credits are charged during the course of the game as chargeable actions are performed. The sizes of the prizes the player may win are determined substantially independently from the amount of credits charged. It is possible in some embodiments of the present invention for the player to be charged nothing and yet the player may win a prize.

If a predefined prize event or condition occurs during the course of the game, the player may be awarded a predefined prize. The prize amount may be credited to the player's bank and it may be any amount which is defined by the rules of the game.

The game would continue in this way until a point of termination is reached. A point of termination may occur when the player chooses to terminate play, no further game playing steps can be taken, or some predefined event or condition occurs.

The above description sets forth, rather broadly, the more important features of the present invention so that the detail description which follows may be better understood so that present contributions to the art may be better appreciated. There are, of course, additional features of the invention that will be described hereinafter and which will form the subject matter of claims appended hereto. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

FIGS. 2A–2E are schematic representations and a pay table of an underlying game which may be played by the method of the present invention.

FIGS. 4A–4B are schematic representations of a poker game, which may be played with the present invention.

FIGS. 5A–5B are schematic representations of a reel-type game which may be played with the present invention.

DESCRIPTION OF THE PREFERRED EMBODIMENT

The method of the present invention is intended primarily for electronic devices which would use software to implement the invention. However, it is recognized that the method may be adapted to table games and board games.

General Method

Figure 1:
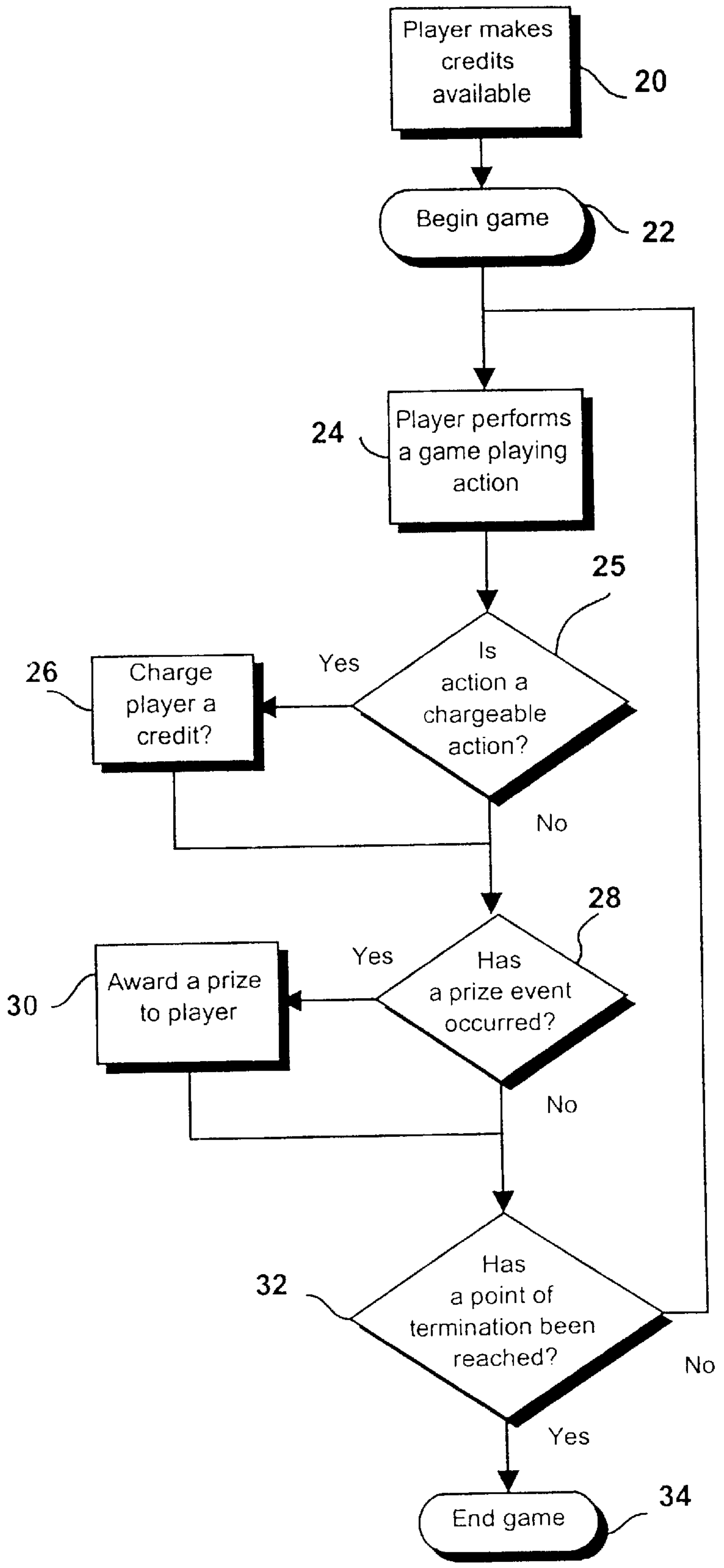
FIG. 1 is a flow chart of the method of the present invention.

As seen in FIG. 1, the method of the present invention may begin by the player making available credits to play the game 20. This may include the player inserting coins or other forms of money into a slot or the player may add credits with a portable memory device, such as a card with a magnetic strip. In the present invention, credits may represent any denomination of any currency. If an electronic gaming device is used, the credits are placed in a virtual bank where credits may be subtracted and added to the bank during the course of the game. If no gaming device is used, a dealer or banker may hold or track credits during the game.

After the player has made available credits 20, the player may begin the game 22. The underlying game may begin automatically when the player makes a predefined number of credits available or the player may be required to initiate the game.

Once the game has begun 22, the player performs “game playing” actions which are performed to play the underlying game 24. Game playing actions are required or necessary to play the underlying game and complete a game cycle. In solitaire, game playing actions include moving cards from the partial deck of cards, moving cards between columns, turning over face-down cards in the columns, moving cards from the columns to the sequential suited stacks and moving cards from the partial deck to the sequential suited stack.

After each game playing action, the method of the present invention inquires to determine if the action is a chargeable action 25. A chargeable action may be any game playing action other than an action which initiates the game. For example, if the underlying game is solitaire, the act of removing a card from the partial deck and placing it in a column could be defined as a chargeable action. A chargeable action may also include moving a card from a column to a sequential-suited stack of cards.

Alternatively, a chargeable action may require the player to perform some action outside of the game. The player, for example, may be required to push a button before performing a game playing action in order to pay the required credits. Some game playing actions may require more credits than others.

Credits charged for chargeable actions are not wagers or antes found in other games. Wagers and antes are put at risk at the beginning of a game cycle as a requirement for participating and initiating the game. Jackpots or prizes won during the game are often calculated as a ratio of the wager. The credits charged in the present invention, on the other hand, are fees imposed for actions performed during the course of the game. The prizes given to the player are determined substantially independently from the charges.

When the player performs a predefined chargeable action, one or more credits are deducted from the player’s bank of credits 26. At this point in the method of the present invention, the game may be examined to determine if a predefined prize, event or condition has occurred 28. A predefined prize event may be any event or occurrence which is defined to award a prize to the player. For example, in the game of solitaire, the predefined event may occur when the player has placed all of the cards in the sequential-suited stacks of cards. Alternatively, the predefined event may occur when a player places a single card in one of the sequential-suited stacks. If the predefined event has occurred 28, a prize is awarded to player 30. The prize may be any predefined credit amount, a physical prize, or a service. For example, credits could be added to the player’s bank. If a predefined prize event or condition has not occurred 28, no prize is awarded.

In the method of the present invention, the game is then examined to determine if the end of the game has been reached 32. This may occur either by the underlying game reaching a state in which progress is impossible, by the player voluntarily terminating the game, or the credit bank being empty. If the end of the game has been reached 32, the game is concluded 34, and the player may be given any credits which remain in the credit bank. If the end of the game has not been reached 32, the method of the present invention returns to a point where the player may perform another action. In this way, the player may continue to play the game until a point of termination is reached.

Blackjack

Figure 2A:
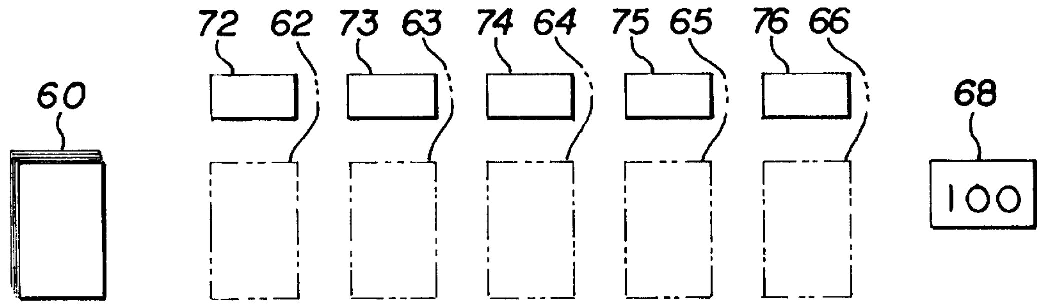

FIGS. 2A through 2E disclose a novel game which may be used with the method of the present invention. FIG. 2A may be presented to a player as an initial screen on an electronic gaming device. A deck of cards 60 is presented face down and five columns 62–66 are presented for receiving cards. A credit bank indicator 68 is provided for indicating the current amount of credits in the virtual credit bank. Each column 62–66 has card value indicator 72–76, respectively, for indicating the value of the cards in the respective column. The deck is preferably a standard 52-card deck which has been shuffled or randomized so that the cards are in a random order. Other embodiments may include special cards, or an infinite deck which is reshuffled after each card is drawn. At this point, a player may make credits available to play the game and may initiate the game.

Figure 2B:
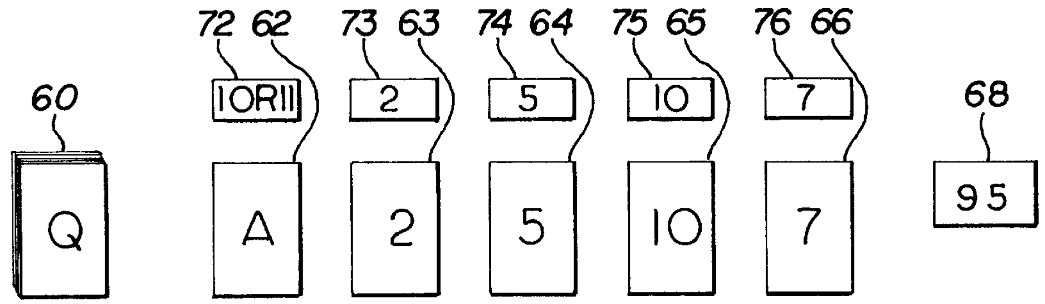

In FIG. 2B, the electronic gaming device has dealt the initial cards from deck 60 into columns 62–66. The action of initiating the game process may be a chargeable action which would deduct a predefined number of credits from the player’s credit bank. Thus, credit bank 68 indicates 95 credits; one credit being deducted for each card dealt.

In this underlying game, a prize event occurs when the player arranges a twenty-one hand (any combination of cards which have a sum of 21) in a column. A player may move a card from the deck 60 to any of columns 62–66 as long as the total value of the cards in the column is not a “bust” (in excess of 21). In an alternative embodiment a player may dispose of a card or replace a card back into the deck. These actions may be chargeable actions. Once a card is placed in a column, the player cannot move the card.

Other prize winning events may be defined. For example two or more 21 hands in one column may be awarded an additional prize. Ranks, suits, or colors may also be used as a basis for awarding prizes.

The table disclosed in FIG. 2E is an example of a pay table which may be used with the blackjack embodiment of the present invention. Winning events may include a series of events, such as two or more blackjacks. Subsequent occurrences may receive a higher prize value than previous occurrences. For example, the second occurrence of a blackjack may receive more than the first occurrence. A series of prize winning events which occur in immediate succession qualify for higher prize values than non-immediate successive occurrences of the same events. Events in immediate succession in a single column may also receive higher prize values than events which occur in different columns. Combinations of winning events may receive higher prize values than events which are a portion of the combination.

Figure 2C:
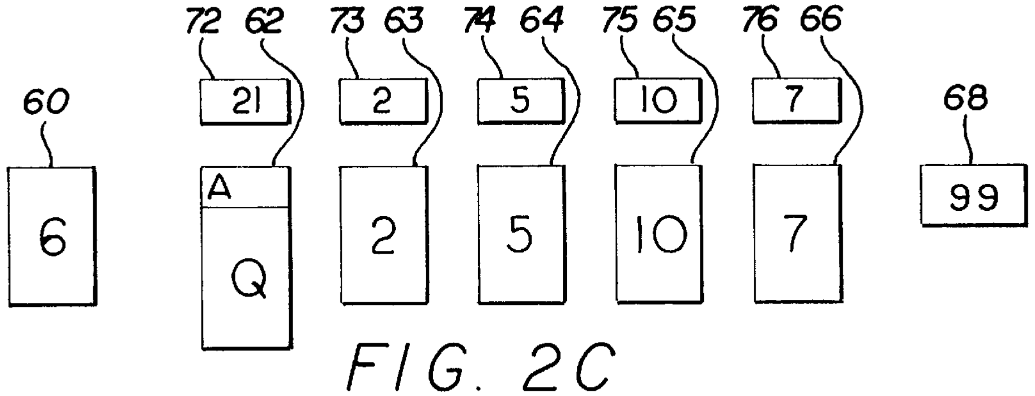

Returning to FIG. 2B, the player, seeing that a queen is face up in deck 60, would put the queen in column 62. The action of moving the queen from deck 60 to column 62 may be a chargeable action which triggers the deduction of another credit from the player's bank. However, since the player has arranged a twenty-one hand in a column, as seen in FIG. 2C, the player would be awarded a predefined prize amount. For example, the prize may be five credits. Since a credit was deducted for moving the queen from deck 60 to column 62, the player's net gain is four credits and the credit bank 68 indicates 99 credits. Once a twenty-one hand is obtained in a column, the cards which comprise the hand are canceled and the value of the cards in the column is zero. The canceled cards may be removed from the column and hidden from view so that the player may use card-counting skills to improve performance. Alternatively, the cards may be left in view.

Figure 2D:
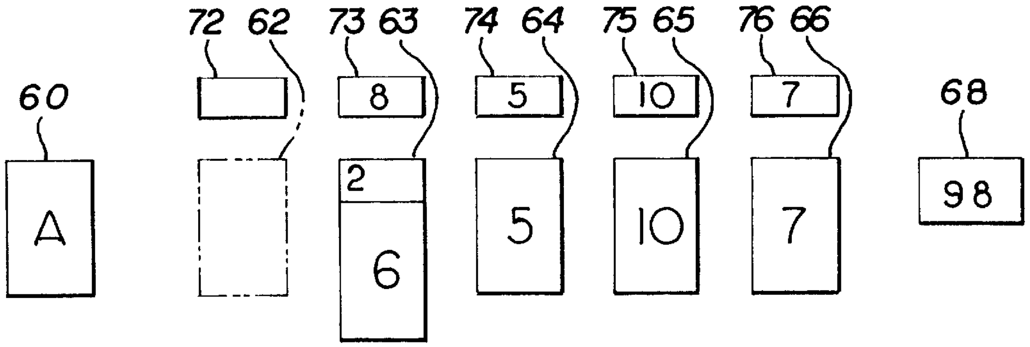

The player now sees that a six card is face up in deck 60. The player has the option of placing the card in any column which would not lead to a bust. Therefore, the player may wish to move the six cards from deck 62 to column 63 as seen in FIG. 2D. The action of moving the card from deck 60 to column 63 automatically deducts a credit from the player's bank and display 68 indicates 98 credits. The game would continue this way until the player has a card showing in deck 60 which cannot be put into a column without busting the column or there are no more cards in the deck. A large prize or jackpot may be awarded if the player successfully places all of the cards in columns 62–66.

This game may take several minutes to complete and the player's skill and intelligence can prolong the game and maximize prize awards. The player may count the cards and track which cards remain in the deck. An operator of the game benefits because the theoretical hold of the game (the amount that is expected to be retained by the operator over time) is sufficient for the operator to make a profit.

The present invention also allows the game operator to offer large prizes. The probability of obtaining a winning hand in a standard blackjack game is relatively high. Consequently, game operators can only offer small prizes. However, the probability of occurrence of some events in the present invention are very low. For example, the probability of obtaining eight suited twenty-one hands in a single column is very low. Therefore, the game operator can offer a large prize for this event. By offering large prizes, the game operator may attract more players and generate more pay.

Solitaire

Figure 3:
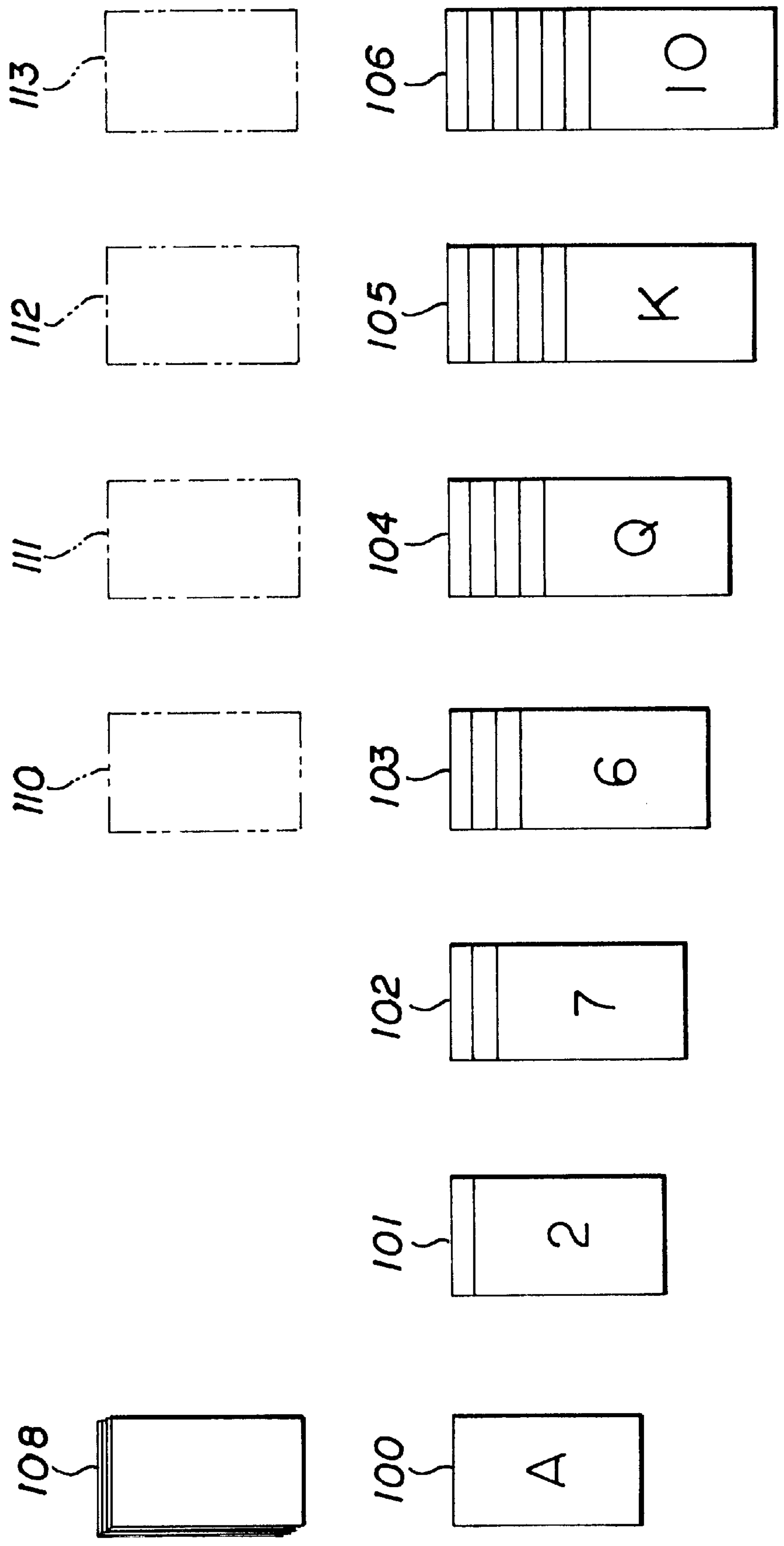
FIG. 3 is schematic representation of a solitaire game, which may be played with the present invention.

FIG. 3 represents the initial layout of a standard game of solitaire. This game may be played electronically or with a deck of cards. Seven columns of cards 100–106 are arranged with each column containing a predefined number of cards. A partial deck of cards 108 contains all cards which were not dealt into the columns 100–106. When the game is played, cards are placed in positions 110–113 to establish sequential suited stacks of cards.

The game of solitaire and its many variations are well known in the art. The method of playing solitaire will not be described in detail. However, the method of the present invention may be applied to this game. A chargeable action may be defined to be any action which is required to play the game. Each time a player performs a chargeable action, such as moving a card from deck 108 to columns 100–106, the player is charged a predefined amount. Each time a prize winning event occurs, such as a card being placed in the sequential suited stacks, a prize may be awarded to the player. Therefore, the present invention allows the well known and widely popular game of solitaire to be played as a wagering game.

Poker

FIG. 4A represents an initial layout for a poker game which may utilize the method of the present invention. Cards from a deck of shuffled cards are dealt to five card positions 132–136. Chargeable actions may include dealing a card from deck 130 to any of the card positions 132–136. Once the initial hand is dealt, the player may inspect the cards and hold any or none of the cards. In the example shown in FIG. 4A, the player has chosen to hold the cards in positions 134 and 136 as indicated by "HOLD" indicators 144 and 146. New cards would then be dealt to non-hold positions 132, 133 and 135.

As seen in FIG. 4B, new cards are dealt to the non-hold positions. If the player does not receive a prize winning hand in the new hand, the player may continue to hold the same cards, may select additional hold cards, or may select all new hold cards. New cards may continue to be dealt until a prize winning hand is received. In FIG. 4B the player received three ten cards and has attained a full house. A full house may be defined to be a prize winning event which would pay the player a predefined prize. In the preferred embodiment, once the player has received a prize winning hand, all of the cards of the hand are discarded and the player receives five new cards. The game would continue this way until a point of termination is reached such as the player terminating the game or all the cards being dealt.

Variations of this game may include displaying discarded or used cards so that the player need not count the cards, allowing the player to hold cards from a winning hand, using multiple decks, and using wild cards. Various modified poker games may also be used with the present invention. In the preferred embodiment, commonly used poker pay tables are used to define winning events.

Reel-Type Slot Machine

FIG. 5A represents a display of a reel-type slot machine. The display may be physical reels or a video screen. In this embodiment of the present invention, the player activates the machine, which may be a chargeable action, and generates a random output as displayed on reels 201–205. The player may then select one or all of the reels to hold. These reels will not rotate when the player activates the reel spinning portion of the game. The reels selected for hold are indicated by "HOLD" indicators 211 and 213. If the player holds no reels, all the reels will spin. The act of holding a reel may be a chargeable action for which the player is charged.

Having selected reels 201 and 203 to hold, the play may activate the reels and obtain a new display. The act of spinning the reels may also be a chargeable action. Having received a seven on reels 202, 204, and 205, as seen in FIG. 5B, the play may decide to hold these reels, as indicated by "HOLD" indicators 212, 214, and 215. The player would then spin reels 201 and 203. The player could continue this way until a winning output or combination of symbols is obtained. If a winning output is obtained, the player is awarded a prize and the player may not be allowed to hold any of the reels. Alternatively, the player may be allowed to hold some of the reels. The game may continue this way indefinitely.

SUMMARY

It may now be realized from the above description that the present invention provides a novel method for wagering on long-duration, multi-step games. Each time a player performs a chargeable action, the player is charged a credit. The chargeable action may be an integral part of the method by which the underlying long-duration, multi-step game is played. If a predefined prize event or condition occurs, the player may be awarded a predefined prize. The underlying game may continue, the player may continue to perform chargeable actions, and prizes may continue to be awarded until the underlying game reaches a point of termination.

The method of the present invention allows players who enjoy long-duration, multi-step games to engage in wagering which increases the excitement and enjoyment of the game. The operator of the wagering game benefits by attracting new customers and profiting from games which would otherwise be unsuitable for wagering.

Although the description above contains many specifications, these should not be construed as limiting the scope of the invention but as merely providing illustrations of some of presently preferred embodiments of this invention. Thus, the scope of the invention should be determined by the appended claims and their legal equivalents rather than by the examples given.

What is claimed is:

1. A method of playing a wagering game on an electronic device, the electronic device having game software for providing an underlying game, the underlying game requiring a player to perform an indefinite number of game playing actions to complete a game cycle, the method comprising the following steps:

(A) the player making at least one credit available to the electronic device;

(B) the player initiating a game cycle;

(C) providing a plurality of game symbols;

(D) allowing the player to place the game symbols in a plurality of groups;

(E) the player performing game playing actions to play the game, the game playing actions being other than an action to begin a game cycle;

(F) the electronic device charging the player a predefined amount of credits for each predefined chargeable action the player performs, the chargeable action being a game playing action, wherein the credits charged the player are an immediate debit to the player not dependent upon the occurrence of a future event; and (G) the electronic device awarding a prize to the player if a predefined prize event occurs.

2. The method of claim 1 further comprising terminating the game if a point of termination is reached.

3. The method of claim 1 wherein a prize event may occur more than once per game cycle.

4. The method of claim 1 wherein an occurrence of a subsequent prize event receives a prize of higher value than an occurrence of a previous event.

5. The method of claim 1 wherein an occurrence of prize events in immediate succession receives a prize of higher value than an occurrence of prize events in non-immediate succession.

6. The method of claim 3 wherein an occurrence of a combination of different prize events receives a prize of higher value than an occurrence of an individual event.

7. The method of claim 1 wherein the prize winning event comprises the player grouping a predefined combination of game symbols together.

8. The method of claim 1 wherein the game symbols comprise indicia of playing cards.

9. The method of claim 8 wherein the playing cards comprise a standard deck of cards, wherein the standard deck of cards comprises four suits, each suit having two through ten, jack, queen, king, and ace.

10. The method of claim 9 wherein the prize winning event comprises the player grouping game symbols together to obtain a twenty-one hand.

11. The method of claim 9 wherein the prize winning event comprises the player grouping game symbols together to obtain a blackjack hand.

12. The method of claim 1 further comprising the step of deleting game symbols after a player has achieved a predefined combination of game symbols.

13. The method of claim 1 wherein the game symbols are presented one at a time.

14. The method of claim 1 wherein the game symbols are presented in a random order.

15. The method of claim 1 wherein a chargeable action comprises grouping a game symbol with at least one other game symbols.

16. The method of claim 1 wherein a chargeable action comprises dealing at least one game symbol to at least one grouping area.

17. A method of playing a wagering game, the method comprising the following steps:

(A) providing an electronic device adapted to operate software;

(B) providing game software on the electronic device, the game software being adapted to present a game, the game requiring a player to perform an indefinite number of game playing actions to complete a game cycle, the game playing actions being other then an action to begin a game cycle;

(C) the player initiating a game cycle;

(D) providing a plurality of game symbols;

(E) allowing the player to place the game symbols in a plurality of groups;

(F) the player performing game playing actions;

(G) the electronic device charging the player a predefined amount of credits for each predefined chargeable action the player performs, the chargeable action being a game playing action, wherein the credits charged the player are an immediate debit to the player not dependent upon the occurrence of a future event; and (H) the electronic device awarding a prize to the player if a prize winning event occurs.

18. The method of claim 17 further comprising the step of the player making credits available to play the game.

19. The method of claim 18 further comprising the step of storing the credits in a virtual bank.

20. The method of claim 17 further comprising the step of the electronic device terminating the game if a point of termination is reached.

21. The method of claim 17 wherein a prize event may occur more than once per game cycle.

22. The method of claim 21 further comprising the step of awarding prize events that occur in immediate succession than for prize events that occur in non-immediate succession.

23. The method of claim 21 further comprising the step of awarding a prize of higher value for the occurrence of a combination of different prize events than for an occurrence of an individual event.

24. The method of claim 21 further the step of awarding a prize of higher value of an occurrence of a subsequent prize event than for an occurrence of a previous prize event.

25. The method of claim 17 wherein a prize winning event comprises the player grouping a predefined combination of game symbols together.

26. The method of claim 17 wherein the game symbols comprise indicia of playing cards.

27. The method of claim 26 wherein the playing cards comprises a standard deck of cards, wherein the standard deck of cards comprises four suits, each suit having two through ten, jack, queen, king, and ace.

28. The method of claim 27 wherein the prize winning event comprises the player grouping game symbols together to obtain a twenty-one hand.

29. The method of claim 27 wherein the prize winning event comprises the player grouping game symbols together to obtain a blackjack hand.

30. The method of claim 17 further comprising the step of deleting game symbols after a player has achieved a predefined combination of game symbols.

31. The method of claim 17 wherein the game symbols are presented one at a time.

32. The method of claim 17 wherein the game symbols are presented in a randomly determined order.

33. The method of claim 17 wherein a chargeable action comprises grouping a game symbol with at least one other game symbol.

34. The method of claim 17 wherein a chargeable action comprises dealing at least one game symbol to at least one grouping area.

35. An electronic wagering device comprising the following:

(A) a computer, the computer being adapted to operate software, receive input commands, and display information;

(B) game software installed on the computer, the game software being adapted to perform the following:

(a) operate a game and generate a game display, the game requiring a player to perform an indefinite number of game playing actions to complete a game cycle, the game playing actions being other than an action to begin a game cycle, the game display comprising a plurality of game symbols;

(b) charge the player a predefined amount of credits for each predefined chargeable action the player performs, the chargeable action being a game playing action, wherein the credits charged the player are an immediate debit to the player not dependent upon the occurrence of a future event;

(c) allow a player to group a game symbol with other game symbols; and (d) award a prize to the player when a prize winning event occurs.

36. The electronic wagering device of claim 35 further comprising means for accepting credits from a player.

37. The electronic wagering device of claim 35 wherein the game software is further adapted to store credits in a virtual bank.

38. The electronic wagering device of claim 37 wherein the game software is further adapted to deduct credits from the virtual bank.

39. The electronic wagering device of claim 37 wherein the game symbols arc presented in a random order.

40. The electronic wagering device of claim 35 wherein the game software is further adapted to award a combination prize when a combination of prize events occur.

41. The electronic wagering device of claim 35 wherein the game software is further adapted to award a prize of greater value for the occurrence of a subsequent prize event than for a previous prize event.

42. The electronic wagering device of claim 35 wherein a prize winning event comprises the player grouping a predefined combination of game symbols together.

43. The electronic wagering device of claim 35 wherein the game symbols comprise indicia of playing cards.

44. The electronic wagering device of claim 43 wherein the playing cards comprises a standard deck of cards, wherein the standard deck of cards comprises four suits, each suit having two through ten, jack, queen, king, and ace.

45. The electronic wagering device of claim 44 wherein the prize winning event comprises the player grouping game symbols together to obtain a twenty-one hand.

46. The electronic wagering device of claim 44 wherein the prize winning event comprises the player grouping game symbols together to obtain a blackjack hand.

47. The electronic wagering device of claim 35 further comprising the step of deleting game symbols after a player has achieved a predefined combination of game symbols.

48. The electronic wagering device of claim 35 wherein the game symbols are presented one at a time.

49. The electronic wagering device of claim 35 wherein a chargeable action comprises grouping a game symbol with at least one other game symbol.

50. The electronic wagering device of claim 35 wherein a chargeable action comprises dealing at least one game symbol to at least one grouping area.

* * * * *